(12) United States Patent
Oda et al.

(10) Patent No.: US 11,735,748 B2
(45) Date of Patent: Aug. 22, 2023

(54) POWER GENERATION CELL AND RESIN-FRAMED MEMBRANE ELECTRODE ASSEMBLY

(71) Applicant: HONDA MOTOR CO., LTD., Tokyo (JP)

(72) Inventors: Masaru Oda, Wako (JP); Takaaki Shikano, Wako (JP); Satoshi Aoki, Wako (JP); Takuma Yamawaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/681,820

(22) Filed: Feb. 27, 2022

(65) Prior Publication Data
US 2022/0311019 A1    Sep. 29, 2022

(30) Foreign Application Priority Data

Mar. 29, 2021 (JP) ................................ 2021-054485

(51) Int. Cl.
| | |
|---|---|
| *H01M 8/0273* | (2016.01) |
| *H01M 8/1004* | (2016.01) |
| *H01M 8/0284* | (2016.01) |
| *H01M 8/0258* | (2016.01) |
| *H01M 4/88* | (2006.01) |

(52) U.S. Cl.
CPC ....... *H01M 8/0273* (2013.01); *H01M 4/8807* (2013.01); *H01M 8/0258* (2013.01); *H01M 8/0284* (2013.01); *H01M 8/1004* (2013.01)

(58) Field of Classification Search
None
See application file for complete search history.

(56) References Cited

U.S. PATENT DOCUMENTS

| | | | |
|---|---|---|---|
| 9,553,324 B2 | 1/2017 | Tanaka et al. | |
| 10,573,905 B2 | 2/2020 | Ishida et al. | |
| 2008/0070080 A1 | 3/2008 | Miyazaki | |
| 2010/0129694 A1* | 5/2010 | Sugiura ................ | H01M 8/026 |
| | | | 429/483 |
| 2014/0011111 A1 | 1/2014 | Mitsuta et al. | |

(Continued)

FOREIGN PATENT DOCUMENTS

| | | |
|---|---|---|
| CN | 103531830 A | 1/2014 |
| CN | 208753435 U | 4/2019 |

(Continued)

OTHER PUBLICATIONS

Office Action including search report dated Jan. 18, 2023 issued over the corresponding Chinese Patent Application No. 202210186353.X with the English translation of the Office Action's pertinent portion.

*Primary Examiner* — Basia A Ridley
*Assistant Examiner* — Heng M. Chan
(74) *Attorney, Agent, or Firm* — Carrier, Shende & Associates P.C.; Joseph P. Carrier; Jeffrey T. Gedeon (57) ABSTRACT

A power generation cell includes a resin-framed electrolyte membrane electrode assembly. The cathode of the resin-framed membrane electrode assembly has a larger surface dimension than the anode. An outer peripheral portion of the anode is positioned between a first buffer and a fuel gas flow field. An outer peripheral portion of the cathode is positioned between the resin frame member and the second buffer.

10 Claims, 5 Drawing Sheets

(56) References Cited

U.S. PATENT DOCUMENTS

| | | | |
|---|---|---|---|
| 2014/0120452 A1 | 5/2014 | Yamauchi et al. | |
| 2017/0237085 A1* | 8/2017 | Kojima | H01M 8/0265 429/483 |
| 2019/0131633 A1* | 5/2019 | Ishida | H01M 8/026 |
| 2022/0302470 A1 | 9/2022 | Shikano et al. | |

FOREIGN PATENT DOCUMENTS

| | | |
|---|---|---|
| JP | 2006-172924 A | 6/2006 |
| JP | 2014-182967 A | 9/2014 |
| JP | 2019-079736 A | 5/2019 |
| JP | 2022-146434 A | 10/2022 |
| WO | 2013/171939 A1 | 11/2013 |

* cited by examiner

POWER GENERATION CELL AND RESIN-FRAMED MEMBRANE ELECTRODE ASSEMBLY

CROSS-REFERENCE TO RELATED APPLICATIONS

This application is based upon and claims the benefit of priority from Japanese Patent Application No. 2021-054485 filed on Mar. 29, 2021, the contents of which are incorporated herein by reference.

BACKGROUND OF THE INVENTION

Field of the Invention

The present invention relates to a power generation cell and a resin-framed membrane electrode assembly.

Description of the Related Art

Conventionally, a fuel cell (power generation cell) including a membrane electrode assembly (MEA) and separators (bipolar plates) disposed on both sides of the MEA has been known. The MEA includes an electrolyte membrane of a polymer ion exchange membrane, an anode provided on one surface of the electrolyte membrane, and a cathode provided on the other surface of the electrolyte membrane. In general, a predetermined number of power generation cells are stacked together to form a fuel cell stack. For example, the fuel cell stack is mounted as an in-vehicle fuel cell stack on a fuel cell vehicle (e.g., fuel cell electric automobile).

The fuel cells each includes a reactant gas flow field through which a reactant gas flows along a power generation area of the membrane electrode assembly, a passage through which the reactant gas flows along a stacking direction of the fuel cells, and a buffer for distributing or collecting the reactant gas in a flow field width direction between the reactant gas flow field and the passage (for example, see JP 2006-172924 A).

SUMMARY OF THE INVENTION

By the way, there is a case where the outer peripheral portion of the anode and the outer peripheral portion of the cathode are disposed at positions overlapping with the buffer. In this case, the presence of the anode and the cathode limits the depth of the buffer (the height of the flow path) at positions overlapping with the buffer. Therefore, pressure loss increases at the depth limited area, so that the gases cannot be distributed uniformly in the power generation area. On the other hand, if priority is given to ensuring the depth of the buffer, the thickness per unit cell of the fuel cell increases.

In view of the above, it is desirable to suppress increase in pressure loss in the buffer and improve the performance of the buffer while suppressing increase in thickness per unit cell.

An object of the present invention is to solve the above-described problems.

A first aspect of the present invention is a power generation cell including: a resin-framed membrane electrode assembly having a membrane electrode assembly and a resin frame member joined to an outer peripheral portion of the membrane electrode assembly; a first separator provided on one surface of the resin-framed membrane electrode assembly; and a second separator provided on another surface of the resin-framed membrane electrode assembly, wherein the membrane electrode assembly includes an electrolyte membrane, a first electrode provided on one surface of the electrolyte membrane, and a second electrode provided on another surface of the electrolyte membrane and having surface dimensions greater than that of the first electrode, the first separator includes a first reactant gas flow field facing a power generation area of the membrane electrode assembly and allowing a first reactant gas to flow, a first passage penetrating through the power generation cell in a thickness direction, and a first buffer connecting the first reactant gas flow field to the first passage, the second separator includes a second reactant gas flow field facing the power generation area of the membrane electrode assembly and allowing a second reactant gas to flow, a second passage penetrating through the power generation cell in the thickness direction, and a second buffer connecting the second reactant gas flow field to the second passage, an outer peripheral portion of the first electrode is positioned between the first buffer and the first reactant gas flow field, and an outer peripheral portion of the second electrode is arranged between the resin frame member and the second buffer in a direction in which the resin-framed membrane electrode assembly and the second separator are stacked.

A second aspect of the present invention is a resin-framed membrane electrode assembly including a membrane electrode assembly and a resin frame member joined to an outer peripheral portion of the membrane electrode assembly, wherein the membrane electrode assembly includes an electrolyte membrane, a first electrode provided on one surface of the electrolyte membrane, and a second electrode provided on another surface of the electrolyte membrane and having surface dimensions greater than the first electrode, the first electrode includes a first electrode catalyst layer provided on the one surface of the electrolyte membrane, and a first gas diffusion layer laminated on the first electrode catalyst layer, the second electrode includes a second electrode catalyst layer provided on the another surface of the electrolyte membrane, and a second gas diffusion layer laminated on the second electrode catalyst layer and having surface dimensions greater than surface dimensions of the first gas diffusion layer, the electrolyte membrane, the first electrode catalyst layer and the second electrode catalyst layer form a catalyst coated membrane, the resin frame member includes a first frame-shaped sheet, a second frame-shaped sheet joined to the first frame-shaped sheet, an inner peripheral portion of the first frame-shaped sheet and an inner peripheral portion of the second frame-shaped sheet sandwich the electrolyte membrane, the first electrode catalyst layer and the second electrode catalyst layer at an outer peripheral portion of the catalyst coated membrane, the resin frame member includes a non-overlapping portion that is not overlapped with the catalyst coated membrane, an outer end of the first gas diffusion layer in positioned inwardly of the non-overlapping portion, and an outer peripheral portion of the second gas diffusion layer is positioned within the non-overlapping portion.

According to the present invention, the outer peripheral portion of the first electrode is positioned between the first buffer and the first reactant gas flow field, and the outer peripheral portion of the second electrode is positioned between the resin frame member and the second buffer. In this manner, because the outer peripheral portion of the first electrode does not overlap with the first buffer, it is easy to secure the depth (flow path height) in the first buffer. Therefore, it is possible to suppress increase in pressure loss in the buffer and improve the performance of the buffer while suppressing increase in thickness per unit cell.

The above and other objects features and advantages of the present invention will become more apparent from the following description when taken in conjunction with the accompanying drawings in which a preferred embodiment of the present invention is shown by way of illustrative example.

DESCRIPTION OF THE INVENTION

Figure 1:
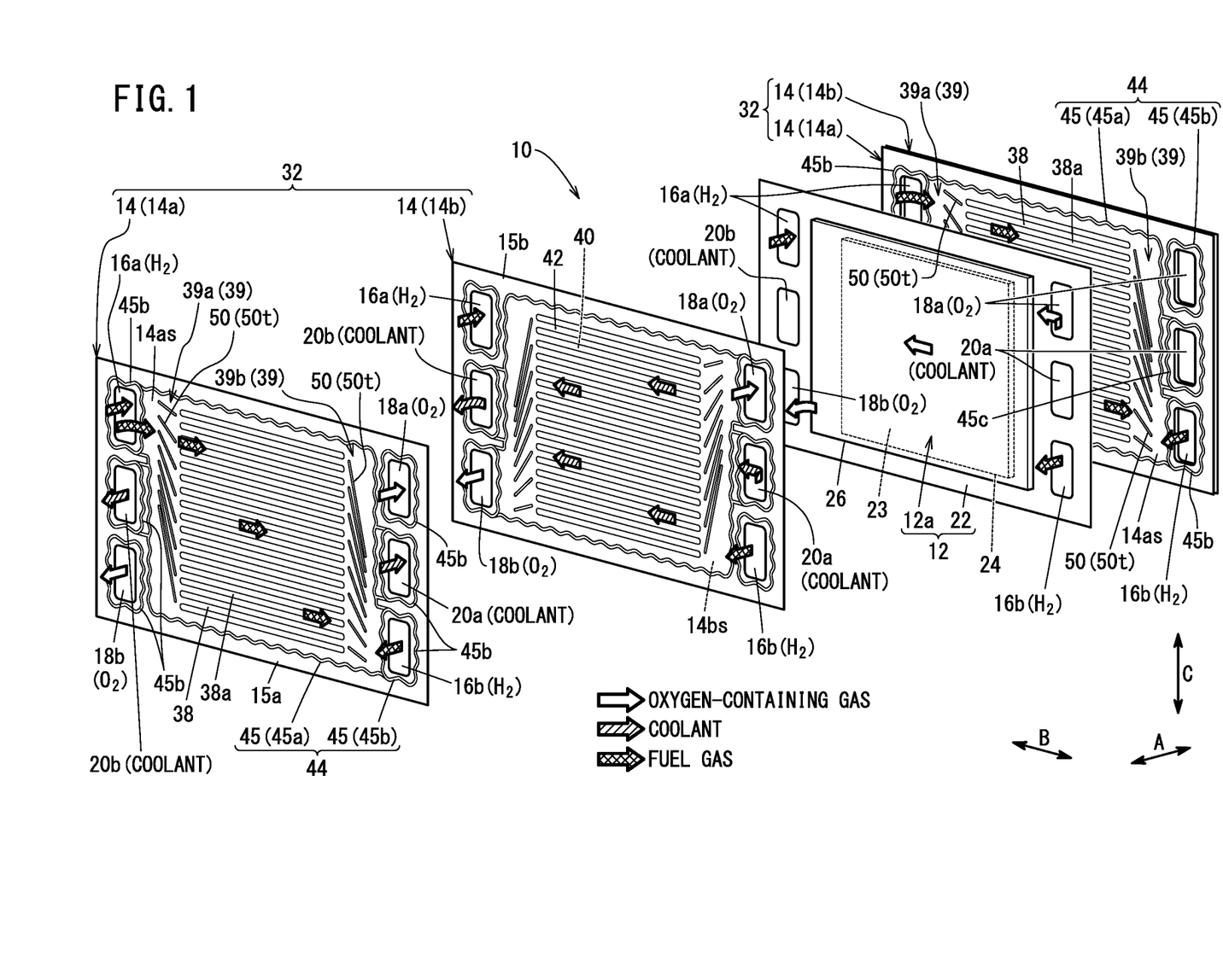
FIG. 1 is an exploded perspective view of a power generation cell according to an embodiment of the present invention.

As shown in FIG. 1, the power generation cell (fuel cell) 10 includes a resin-framed membrane electrode assembly (hereinafter referred to as the "resin-framed MEA 12"), and separators 14 provided respectively on both sides of the resin-framed MEA 12. The fuel cell 10 is a solid polymer electrolyte fuel cell having, for example, a horizontally long (or vertically long) rectangular shape.

The plurality of power generation cells 10 are stacked in the horizontal direction (direction of arrow A) or the vertical direction (direction of arrow C), and a fastening load (compression load) is applied to the plurality of stacked power generation cells 10 in the stacking direction to form a fuel cell stack. For example, the fuel cell stack is mounted in a fuel cell electric vehicle (not shown) as an in-vehicle fuel cell stack.

An oxygen-containing gas supply passage 18a, a coolant supply passage 20a, and a fuel gas discharge passage 16b are provided at one end of the power generation cell 10 in the direction indicated by arrow B (horizontal direction). An oxygen-containing gas is supplied through the oxygen-containing gas supply passage 18a. A coolant is supplied through the coolant supply passage 20a. A fuel gas, for example, a hydrogen-containing gas is discharged through the fuel gas discharge passage 16b. The oxygen-containing gas supply passage 18a, the coolant supply passage 20a, and the fuel gas discharge passage 16b penetrate the power generation cell 10 in the direction indicated by arrow A that is the stacking direction of the power generation cells 10, and are arranged in the direction indicated by arrow C (vertical direction).

At the other end of the power generation cell 10 in the direction indicated by arrow B, a fuel gas supply passage 16a for supplying the fuel gas, a coolant discharge passage 20b for discharging the coolant, an oxygen-containing gas discharge passage 18b for discharging the oxygen-containing gas are provided. The fuel gas supply passage 16a, the coolant discharge passage 20b, and the oxygen-containing gas discharge passage 18b penetrate the power generation cell 10 in the direction indicated by arrow A that is the stacking direction of the power generation cells 10, and are arranged in the direction indicated by arrow C.

In the power generation cell 10, the resin-framed MEA 12 is sandwiched between the metal separators 14. Hereinafter, the separator 14 disposed on one surface of the resin-framed MEA 12 is also referred to as a "first separator 14a". The separator 14 disposed on the other surface of the resin-framed MEA 12 is also referred to as a "second separator 14b". The first separator 14a and the second separator 14b respectively have laterally long (or vertically long) rectangular shapes.

The resin-framed MEA 12 includes a membrane electrode assembly (hereinafter referred to as "MEA 12a") and a resin frame member 22 that is joined to an outer peripheral portion of the MEA 12a, and surrounds the outer peripheral portion of the MEA 12a along its entire periphery.

Figure 2:
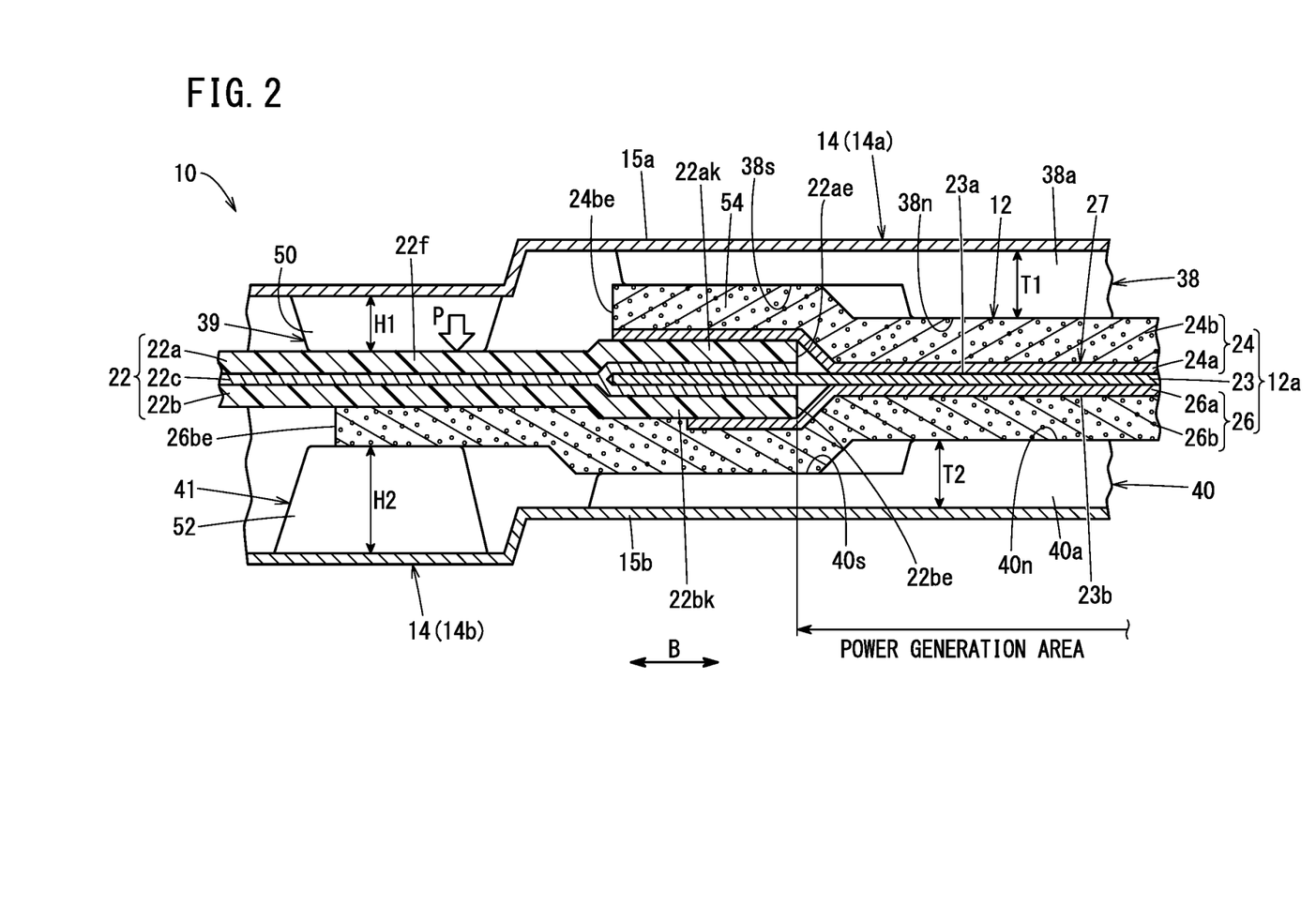
FIG. 2 is a cross-sectional view of the power generation cell shown in FIG. 1.

As shown in FIG. 2, the MEA 12a has an electrolyte membrane 23, an anode 24 provided on one surface of the electrolyte membrane 23, and a cathode 26 provided on the other surface of the electrolyte membrane 23. The electrolyte membrane 23 is, for example, a solid polymer electrolyte membrane (cation exchange membrane). The solid polymer electrolyte membrane is formed by impregnating a thin membrane of perfluorosulfonic acid with water, for example. The electrode membrane 23 is sandwiched between the anode 24 and the cathode 26. As the electrolyte membrane 23, an HC (hydrocarbon)-based electrolyte can be used in addition to the fluorine-based electrolyte. The resin frame member 22 is a rectangular frame-shaped resin film (sub-gasket) in its planar shape and has an inner peripheral portion joined to the outer peripheral portion of an MEA 12a.

As shown in FIG. 1, the fuel gas discharge passage 16b, the oxygen-containing gas supply passage 18a, the coolant supply passage 20a are provided at one end of each of the resin frame member 22, the first separator 14a and the second separator 14b in the direction indicated by arrow B. The fuel gas supply passage 16a, the oxygen-containing gas discharge passage 18b and the coolant discharge passage 20b are provided at the other end of each of the resin frame member 22, the first separator 14a and the second separator 14b in the direction indicated by arrow B.

The separators 14 are formed by press-forming a steel plate, a stainless steel plate, an aluminum plate, a plated steel plate, or a thin metal plate whose metal surfaces are subjected to anti-corrosion treatment, to have a corrugated shape in cross section. An outer peripheral portions of the first separator 14a and the second separator 14b are joined together by welding, brazing, crimping, etc. The first separator 14a and the second separator 14b joined to each other form a joint separator 32. Between the first separator 14a and the second separator 14b adjacent to each other, a coolant flow field 42 communicating with the coolant supply passage 20a and the coolant discharge passage 20b and extending in the direction of arrow B is formed.

The first separator 14a has a fuel gas flow field 38 on its surface 14as facing the resin-framed MEA 12. The fuel gas flow field 38 is connected to the fuel gas supply passage 16a and the fuel gas discharge passage 16b. Specifically, the fuel gas flow field 38 is formed between the first separator 14a and the resin-framed MEA 12. The fuel gas flow field 38 is a flow path facing the power generation area of the MEA 12a for allowing the fuel gas to flow therethrough. The fuel gas flow field 38 has a plurality of flow field ridges 38a extending in the direction of arrow B. Each of the flow field ridges 38a may have a wavy shape. A plurality of flow field grooves are formed between the flow field ridges 38a.

A first inlet buffer 39a that is communicated with (connected to) the fuel gas supply passage 16a and the fuel gas flow field 38, and a first outlet buffer 39b that is communicated with (connected to) the fuel gas flow field 38 and the fuel gas discharge passage 16b are provided on the surface 14as of the first separator 14a. The first inlet buffer 39a distributes the fuel gas introduced from the fuel gas supply passage 16a in the width direction of the fuel gas flow field 38. The first outlet buffer 39b collects, in the width direction of the fuel gas flow field 38, the fuel gas having passed through the fuel gas flow field 38 and guides the collected fuel gas to the fuel gas discharge passage 16b.

Each of the first inlet buffer 39a and the first outlet buffer 39b includes a plurality of protrusions 50 protruding toward the resin frame member 22. In FIG. 1, the plurality of protrusions 50 are a plurality of flow guide protrusions 50t in a shape of line. The plurality of protrusions 50 may be a plurality of bosses dispersedly arranged in a dotted manner. Hereinafter, the first inlet buffer 39a and the first outlet buffer 39b may be collectively referred to as a "first buffer 39".

A first seal line 44 for preventing leakage of the fluid (fuel gas, oxygen-containing gas or coolant) is provided integrally with the first separator 14a on a surface 14as of the first separator 14a. A first seal line 44 is formed on an outer peripheral portion of the first separator 14a. The first seal line 44 bulges (protrudes) toward the resin frame member 22. The first seal line 44 is brought into airtight and liquid-tight contact with the resin frame member 22.

The first seal line 44 has a plurality of bead seal structures 45. The plurality of bead seal structures 45 include a wave-shaped peripheral bead seal 45a surrounding the fuel gas flow field 38 and a plurality of passage beads 45b individually surrounding the passages 16a, 16b, 18a, 18b, 20a, and 20b. The peripheral bead seal 45a surrounds the fuel gas flow field 38, the fuel gas supply passage 16a, and the fuel gas discharge passage 16b to allow communication between the flow field 38, and the passages 16a, 16b. The shapes of the peripheral bead seal 45a and the passage bead 45b may be formed of straight lines in the planar shape.

Figure 3:
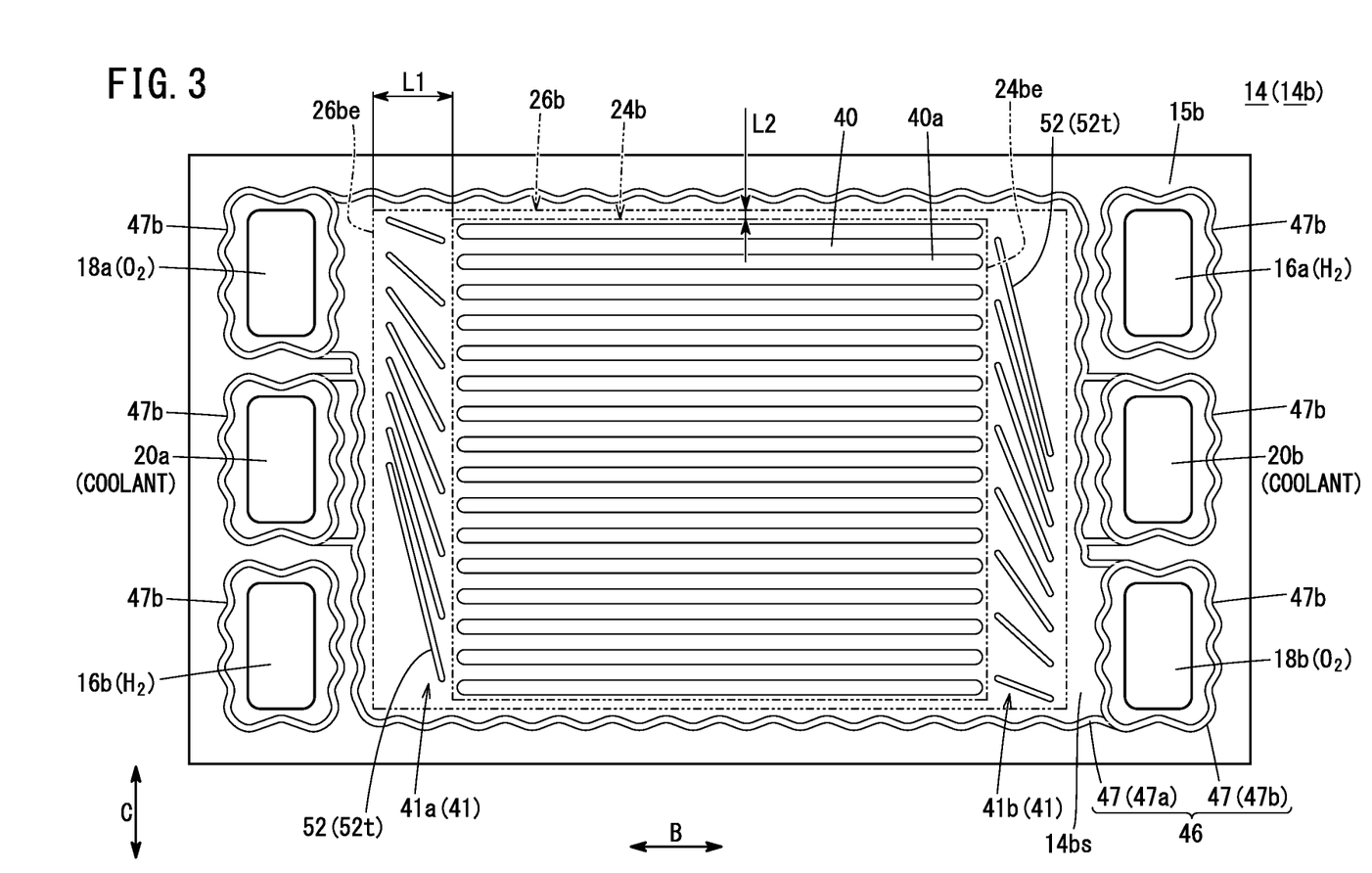
FIG. 3 is a plan view of a second separator.

As shown in FIG. 3, the second separator 14b has an oxygen-containing gas flow field 40 on its surface 14bs facing the resin-framed MEA 12. The oxygen-containing gas flow field 40 is connected to the oxygen-containing gas supply passage 18a and the oxygen-containing gas discharge passage 18b. Specifically, the oxygen-containing gas flow field 40 is formed between the second separator 14b and the resin-framed MEA 12. The oxygen-containing gas flow field 40 is a flow field that faces the power generation area of the MEA 12 and through which the oxygen-containing gas flows. The oxygen-containing gas flow field 40 includes a plurality of oxygen-containing gas flow ridges 40a extending in the direction indicated by arrow B. Each flow field ridge 40a may have a wave shape. A plurality of flow field grooves are formed between the flow field ridges 40a.

A second inlet buffer 41a that is communicated with (connected to) the oxygen-containing gas supply passage 18a and the oxygen-containing gas flow field 40, and a second outlet buffer 41b that is communicated with (connected to) the oxygen-containing gas flow field 40 and the oxygen-containing gas discharge passage 18b are provided on the surface 14bs of the second separator 14b. The second inlet buffer 41a distributes the oxygen-containing gas introduced from the oxygen-containing gas supply passage 18a in the width direction of the oxygen-containing gas flow field 40. The second outlet buffer 41b collects the oxygen-containing gas that has passed through the oxygen-containing gas flow field 40 in the width direction of the oxygen-containing gas flow field 40 and discharges the collected oxygen-containing gas to the oxygen-containing gas discharge passage 18b.

Each of the second inlet buffer 41a and the second outlet buffer 41b includes a plurality of protrusions 52 protruding toward the resin frame member 22. In FIG. 3, the plurality of protrusions 52 are a plurality of flow guide protrusions 52t in a shape of line. The plurality of protrusions 52 may be a plurality of bosses dispersedly arranged in a dotted shape. Hereinafter, the second inlet buffer 41a and the second outlet buffer 41b may be collectively referred to as a "second buffer 41".

A second seal line 46 for preventing leakage of the fluid is provided integrally with the second separator 14b on the surface 14bs of the second separator 14b. The second seal line 46 is formed on an outer peripheral portion of the second separator 14b. The second seal line 46 bulges toward the resin frame member 22. The second seal line 46 is brought into airtight and liquid-tight contact with the resin frame member 22.

The second seal line 46 has a plurality of bead seal structures 47. The plurality of bead seal structures 47 include a wave-shaped peripheral bead seal 47a and a plurality of passage beads 47b individually surrounding the passages 16a, 16b, 18a, 18b, 20a, and 20b. The peripheral bead seal 47a surrounds the oxygen-containing gas flow field 40, the oxygen-containing gas supply passage 18a, and the oxygen-containing gas discharge passage 18b to allow communication between the flow field 40, and the passages 18a, 18b. The shapes of the peripheral bead seal 47a and the passage bead 47b may be formed of straight lines in the planar shape.

Next, a specific structure of the resin-framed MEA 12 will be described with reference to FIG. 2.

The anode 24 has a first electrode catalyst layer 24a joined to one surface 23a of the electrolyte membrane 23, and a first gas diffusion layer 24b stacked on the first electrode catalyst layer 24a. The first gas diffusion layer 24b is considerably thicker than the first electrode catalyst layer 24a. The cathode 26 includes a second electrode catalyst layer 26a joined to the other surface 23b of the electrolyte membrane 23, and a second gas diffusion layer 26b stacked on the second electrode catalyst layer 26a. The second gas diffusion layer 26b is considerably thicker than the second electrode catalyst layer 26a. The electrolyte membrane 23, the first electrode catalyst layer 24a, and the second electrode catalyst layer 26a form a catalyst coated membrane 27 (CCM). The surface size of the cathode 26 is larger than the surface size of the anode 24. Specifically, the surface size of the second gas diffusion layer 26b of the cathode 26 is larger than the surface size of the first gas diffusion layer 24b of the anode 24.

The first electrode catalyst layer 24a is formed by depositing porous carbon particles uniformly on the surface of the first gas diffusion layer 24b together with ion conductive polymer binder, and platinum alloy is supported on surfaces of the carbon particles. The second electrode catalyst layer 26a is formed by depositing porous carbon particles uniformly on the surface of the second gas diffusion layer 26b together with ion conductive polymer binder, and platinum alloy is supported on surfaces of the carbon particles. The surface shapes of the first electrode catalyst layer 24a and the second electrode catalyst layer 26a are both rectangular.

The surface dimension of the first electrode catalyst layer 24a is greater than that of the second electrode catalyst layer 26a. Therefore, the outer peripheral portion of the first electrode catalyst layer 24a protrudes outward from the outer peripheral end of the second electrode catalyst layer 26a over the entire periphery of the outer peripheral portion. The surface size of the first electrode catalyst layer 24a and the surface size of the electrolyte membrane 23 are substantially the same. The surface size of the second electrode catalyst layer 26a is smaller than the surface size of the electrolyte membrane 23. Accordingly, the outer peripheral end of the second electrode catalyst layer 26a is positioned inward of the outer peripheral end of the electrolyte membrane 23 over the entire periphery of the outer peripheral end of the second electrode catalyst layer 26a.

Each of the first gas diffusion layer 24b and the second gas diffusion layer 26b comprises a carbon paper, a carbon cloth, etc. The surface shape of each of the first gas diffusion layer 24b and the second gas diffusion layer 26b is rectangular. The surface dimension of the first gas diffusion layer 24b is substantially the same as the surface dimension of the electrolyte membrane 23 and the surface dimension of the first electrode catalyst layer 24a. Although not illustrated, a microporous layer is formed on the entire surface of each of the first gas diffusion layer 24b and the second gas diffusion layer 26b on the electrolyte membrane 23 side.

The resin frame member 22 includes two frame-shaped sheets (resin sheets). To be specific, the resin frame member 22 has a first frame-shaped sheet 22a and a second frame-shaped sheet 22b joined to the first frame-shaped sheet 22a. In the MEA 12a, a region inward of the inner peripheral end of the resin frame member 22 (the inner peripheral end 22ae of the first frame-shaped sheet 22a and the inner peripheral end 22be of the second frame-shaped sheet 22b) is the power generation area.

The first frame-shaped sheet 22a and the second frame-shaped sheet 22b are made of resin material. Examples of materials of the first resin frame-shaped sheet 22a and the second resin frame-shaped sheet 22b include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin, PI (polyimide).

The first frame-shaped sheet 22a and the second frame-shaped sheet 22b are directly joined to each other over the entire peripheries of the first frame-shaped sheet 22a and the second frame-shaped sheet 22b by the adhesive layer 22c. The surface dimension of the first frame-shaped sheet 22a and the surface dimension of the second frame-shaped sheet 22b are substantially the same as each other. The surface dimension of the first frame-shaped sheet 22a and the surface dimension of the second frame-shaped sheet 22b may be different from each other. The thicknesses of the first frame-shaped sheet 22a and the second frame-shaped sheet 22b are substantially the same. The thicknesses of the first frame-shaped sheet 22a and the second frame-shaped sheet 22b may be different from each other.

An overlapping portion 54 where an inner peripheral portion of the resin frame member 22 and an outer peripheral portion of the anode 24 overlap each other further overlaps steps 38s provided in the flow field ridges 38a forming the fuel gas flow field 38. The overlapping portion 54 is a portion where an inner peripheral portion of the first frame-shaped sheet 22a and an outer peripheral portion of the first gas diffusion layer 24b overlap each other. The steps 38s are provided in each of one end portion and the other end portion of the flow field ridges 38a in the gas flow direction (arrow B direction). The protrusion height in the steps 38s from the base plate portion 15a is smaller than that of normal portions 38n of the flow field ridges 38a. The normal portions 38n are portions of the flow field ridges 38a positioned inward of the steps 38s. The outer peripheral portion of the first gas diffusion layer 24b is pressed toward the second gas diffusion layer 26b by the steps 38s.

The outer peripheral portion of the anode 24 (the outer peripheral portion of the first electrode catalyst layer 24a and the outer peripheral portion of the first gas diffusion layer 24b) is positioned between the first buffer 39 and the fuel gas flow field 38. Accordingly, the protrusions 50 of the first buffer 39 is in direct contact with the resin frame member 22 without intervening the outer peripheral portion of the first gas diffusion layer 24b.

On the other hand, the outer peripheral portion of the cathode 26 (the outer peripheral portion of the second gas diffusion layer 26b) is disposed between the resin frame member 22 and the second buffer 41 in the stacking direction of the resin-framed MEA 12 and the second separator 14b. Therefore, the protrusions 52 of the second buffer 41 abuts on the second gas diffusion layer 26b and supports the second gas diffusion layer 26b. The flow field ridges 40a forming the oxygen-containing gas flow path 40 have steps 40s. The steps 40s are provided at end portions of the flow field ridges 40a in the gas flow direction (arrow B direction). A protruding height in the steps 40s from the base plate portion 15b is smaller than a protruding height of normal portions 40n from the base plate portion 15b. The normal portions 40n are portions positioned inward of the steps 40s. The second gas diffusion layer 26b is pressed by the steps 40s toward the first gas diffusion layer 24b at a position inward of the protrusions 52 in the second buffer 41.

As described above, the outer peripheral portion of the first gas diffusion layer 24b is positioned between the first buffer 39 and the fuel gas flow field 38, and the outer peripheral portion of the second gas diffusion layer 26b is positioned between the resin frame member 22 and the second buffer 41. The depth H2 (flow path height) of the second buffer 41 is deeper than the depth H1 (flow path height) of the first buffer 39. That is, the protrusion height of the protrusions 52 in the second buffer 41 is higher than the protrusion height of the protrusions 50 in the first buffer 39. The depth H1 of the first buffer 39 (the protrusion height of the protrusions 50) may be substantially equal to the protrusion height T1 of the flow field ridges 38a of the fuel gas flow field 38, or may be different from the protrusion height T1. The depth H2 of the second buffer 41 (the protrusion height of the protrusions 52) is greater than the protrusion height T2 of the flow field ridges 40a of the oxygen-containing gas flow field 40. The depth H2 of the second buffer 41 may be the same as the protrusion height T2 of the flow field ridges 40a.

The electrolyte membrane 23, the first electrode catalyst layer 24a, and the second electrode catalyst layer 26a in the outer peripheral portion of the catalyst coated membrane 27 are sandwiched between the inner peripheral portion of the first frame-shaped sheet 22a and the inner peripheral portion of the second frame-shaped sheet 22b.

The inner peripheral portion of the first frame-shaped sheet 22a has a first overlapping portion 22ak that overlaps the outer peripheral portion of the MEA 12a over the entire periphery of the inner peripheral portion of the first frame-shaped sheet 22a. The inner peripheral end 22ae of the first frame-shaped sheet 22a is positioned inward of an outer peripheral end 24be of the first gas diffusion layer 24b. The inner peripheral portion of the first frame-shaped sheet 22a is sandwiched between the anode 24 and the electrolyte membrane 23. The adhesive layer 22c provided on the inner peripheral portion of the first frame-shaped sheet 22a is in contact with one surface 23a of the electrolyte membrane 23.

The inner peripheral portion of the second frame-shaped sheet 22b has a second overlapping portion 22bk that overlaps the outer peripheral portion of the MEA 12a. The inner peripheral end 22be of the second frame-shaped sheet 22b is positioned inward of an outer peripheral end 26be of the second gas diffusion layer 26b. The inner peripheral portion of the second frame-shaped sheet 22b is sandwiched between the cathode 26 and the electrolyte membrane 23. The adhesive layer 22c provided on the inner peripheral portion of the second frame-shaped sheet 22b is in contact with the other surface 23b of the electrolyte membrane 23.

The resin frame member 22 has a non-overlapping portion 22f that does not overlap the catalyst coated membrane 27. The non-overlapping portion 22f is a portion of the resin frame member 22 positioned outward of the outer peripheral end of the catalyst coated membrane 27. The outer peripheral end 24be of the first gas diffusion layer 24b is positioned inward of the non-overlapping portion 22f of the resin frame member 22 (between the non-overlapping portion 22f and the fuel gas flow field 38). On the other hand, the outer peripheral portion of the second gas diffusion layer 26b overlaps the non-overlapping portion 22f of the resin frame member 22.

As shown in FIG. 3, the surface dimension of the second gas diffusion layer 26b is greater than that of the first gas diffusion layer 24b. Therefore, the outer peripheral portion of the second gas diffusion layer 26b protrudes outward from the outer peripheral end 24be of the first gas diffusion layer 24b over the entire periphery of the outer peripheral portion of the second gas diffusion layer 26b. In FIG. 3, the first extended length L1 is a dimension of the second gas diffusion layer 26b extended outward from the first gas diffusion layer 24b in the longitudinal direction of the rectangular power generation cell 10 (FIG. 1). The longitudinal direction of the power generation cell 10 is the longitudinal direction (arrow B direction) of the fuel gas flow field 38 and the oxygen-containing gas flow path 40. The second extended length L2 is a dimension of the second gas diffusion layer 26b extended outward from the first gas diffusion layer 24b in the lateral direction of the power generation cell 10. The lateral direction of the power generation cell 10 is the width direction (arrow C direction) of the fuel gas flow field 38 and the oxygen-containing gas flow field 40. The first extended length L1 is larger than the second extended length L2. The second extended length L2 may be 0. That is, in the lateral direction of the power generation cell 10, the dimension of the first gas diffusion layer 24b and the dimension of the second gas diffusion layer 26b may be the same.

The operation of the power generation cell 10 configured as described above will be described below.

As shown in FIG. 1, the oxygen-containing gas is supplied to the oxygen-containing gas supply passage 18a. The fuel gas such as a hydrogen-containing gas is supplied to the fuel gas supply passage 16a. The coolant such as pure water, ethylene glycol, or oil is supplied to the coolant supply passage 20a.

The oxygen-containing gas flows from the oxygen-containing gas supply passage 18a into the oxygen-containing gas flow field 40 of the second separator 14b. The oxygen-containing gas flows in the direction indicated by arrow B along the oxygen-containing gas flow field 40 while being supplied to the cathode 26 of the MEA 12a. On the other hand, the fuel gas is introduced from the fuel gas supply passage 16a into the fuel gas flow field 38 of the first separator 14a. The fuel gas moves in the direction of arrow B along the fuel gas flow field 38 while being supplied to the anode 24 of the MEA 12a. The pressure of the fuel gas supplied to the power generation cell 10 is higher than the pressure of the oxygen-containing gas supplied to the power generation cell 10. Therefore, the fuel gas having a pressure higher than that of the oxygen-containing gas flowing through the second buffer 41 flows through the first buffer 39.

In the MEA 12a, the oxygen-containing gas supplied to the cathode 26 and the fuel gas supplied to the anode 24 are consumed at the second electrode catalyst layer 26a and the first electrode catalyst layer 24a by electrochemical reactions. Electric power is thus generated.

Then, in FIG. 1, the oxygen-containing gas is then discharged along the oxygen-containing gas discharge passage 18b in the direction indicated by arrow A. Similarly, the fuel gas is then discharged in the direction of arrow A along the fuel gas discharge passage 16b.

The coolant supplied to the coolant supply passage 20a is introduced into the coolant flow field 42 formed between the first separator 14a and the second separator 14b. In the coolant flow field 42, the coolant flows in the direction of arrow B. After cooling the MEA 12a, the coolant is discharged from the coolant discharge passage 20b.

The present embodiment has the following effects.

As shown in FIG. 2, the outer peripheral portion of the anode 24 is positioned between the first buffer 39 and the fuel gas flow field 38, and the outer peripheral portion of the cathode 26 is arranged between the resin frame member 22 and the second buffer 41. For this reason, since the outer peripheral portion of the anode 24 (the first gas diffusion layer 24b) does not overlap the first buffer 39, it is easy to secure the depth H1 (flow path height) in the first buffer 39. Therefore, it is possible to suppress an increase in pressure loss in the first buffer 39 while suppressing increase in thickness per unit cell. Thus, the performance of the first buffer 39 can be improved.

The fuel gas having a pressure higher than that of the oxygen-containing gas flowing through the second buffer 41 flows through the first buffer 39. Therefore, a repetitive stress based on the gas differential pressure P acts on the resin frame member 22 from the first buffer 39 side toward the second buffer 41 side. In this case, the resin frame member 22 is supported by the outer peripheral portion of the second gas diffusion layer 26b. For this reason, damage to the resin frame member 22 due to repeated stress based on the gas differential pressure P can be suppressed. In addition, the thickness of the resin frame member 22 can be further reduced.

The resin frame member 22 has the first frame-shaped sheet 22a and the second frame-shaped sheet 22b joined to the first frame-shaped sheet 22a. With such an assembled structure, the overlapping portion of the resin frame member 22 with the anode 24 and the cathode 26 can be made thin, thereby suppressing increase in the level difference. Further, the strength of the resin frame member 22 can be improved.

The electrolyte membrane 23, the first electrode catalyst layer 24a, and the second electrode catalyst layer 26a in the outer peripheral portion of the catalyst coated membrane 27 are sandwiched between the inner peripheral portion of the first frame-shaped sheet 22a and the inner peripheral portion of the second frame-shaped sheet 22b. Therefore, it is possible to prevent an iron component (Fe contamination) derived from the separator 14 from entering the electrolyte membrane 23 (power generation area) via the outer end portion of the catalyst coated membrane 27. As a result, deterioration of the electrolyte membrane 23 can be suppressed.

The overlapping portion 54 where the inner peripheral portion of the resin frame member 22 and the outer peripheral portion of the anode 24 overlap each other overlaps the steps 38s depressed than the normal portions 38n of the flow field ridges 38a. Therefore, it is possible to avoid surface pressure from locally increasing at the overlapping portion 54.

Figure 4:
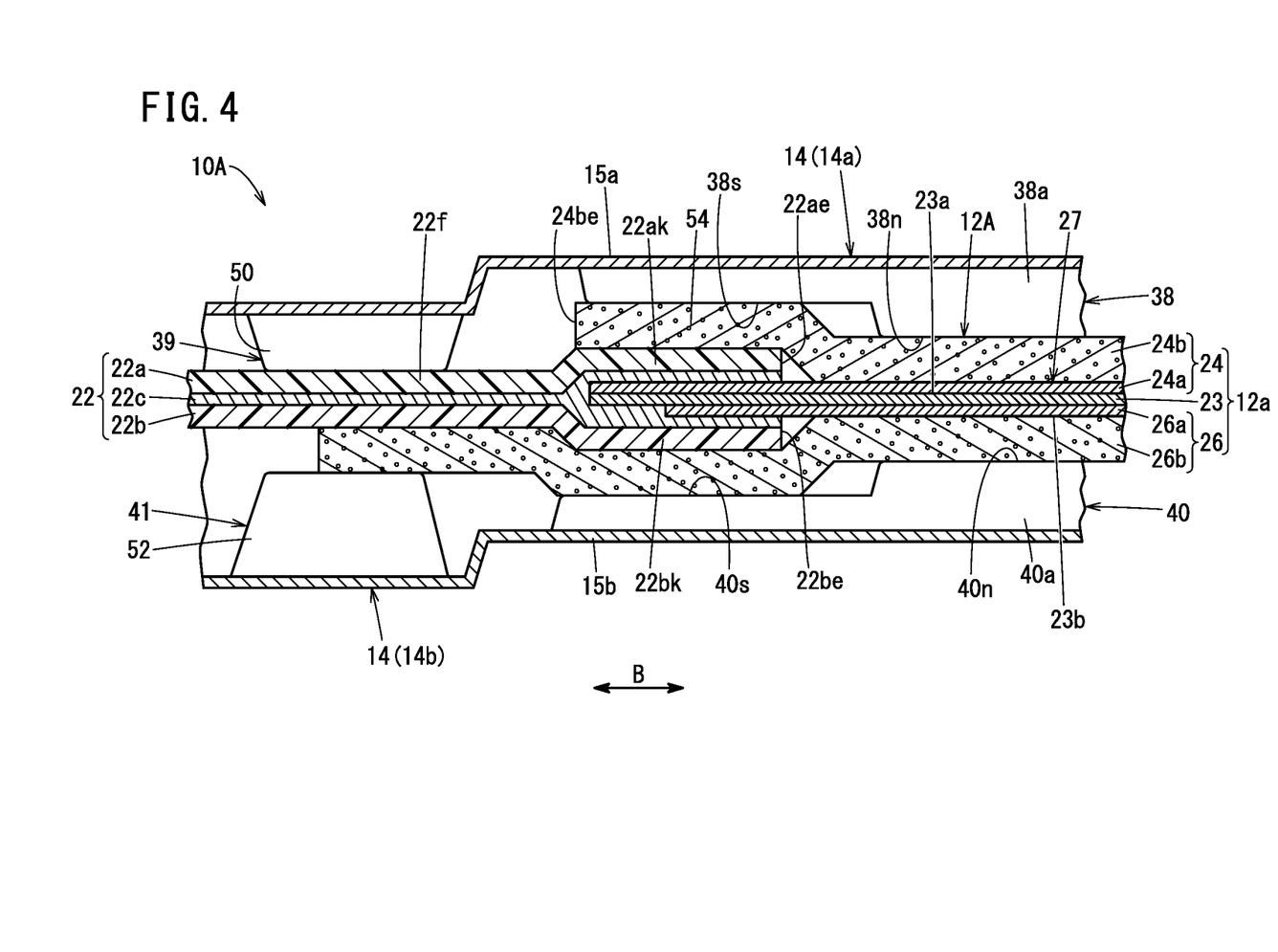
FIG. 4 is a cross-sectional view of a power generation cell according to another aspect (first modification example)

In the resin-framed MEA 12A of the power generation cell 10A according to the embodiment shown in FIG. 4 (first modified embodiment), the outer peripheral portion of the first electrode catalyst layer 24a and the outer peripheral portion of the second electrode catalyst layer 26a are disposed between the inner peripheral portion of the first frame-shaped sheet 22a and the inner peripheral portion of the second frame-shaped sheet 22b. The outer peripheral portion of the first electrode catalyst layer 24a is disposed between the inner peripheral portion of the first frame-shaped sheet 22a and the outer peripheral portion of the electrolyte membrane 23. An inner peripheral portion of the first frame-shaped sheet 22a is joined to the outer peripheral portion of the first electrode catalyst layer 24a via the adhesive layer 22c. The outer peripheral portion of the second electrode catalyst layer 26a is disposed between the inner peripheral portion of the second frame-shaped sheet 22b and the outer peripheral portion of the electrolyte membrane 23. The inner peripheral portion of the second frame-shaped sheet 22b is joined to the outer peripheral portion of the second electrode catalyst layer 26a and the outer peripheral portion (the other surface 23b) of the electrolyte membrane 23 via the adhesive layer 22c. Therefore, the adhesive layer 22c is filled between the outer end surface of the second electrode catalyst layer 26a and the outer end surface of the electrolyte membrane 23.

Figure 5:
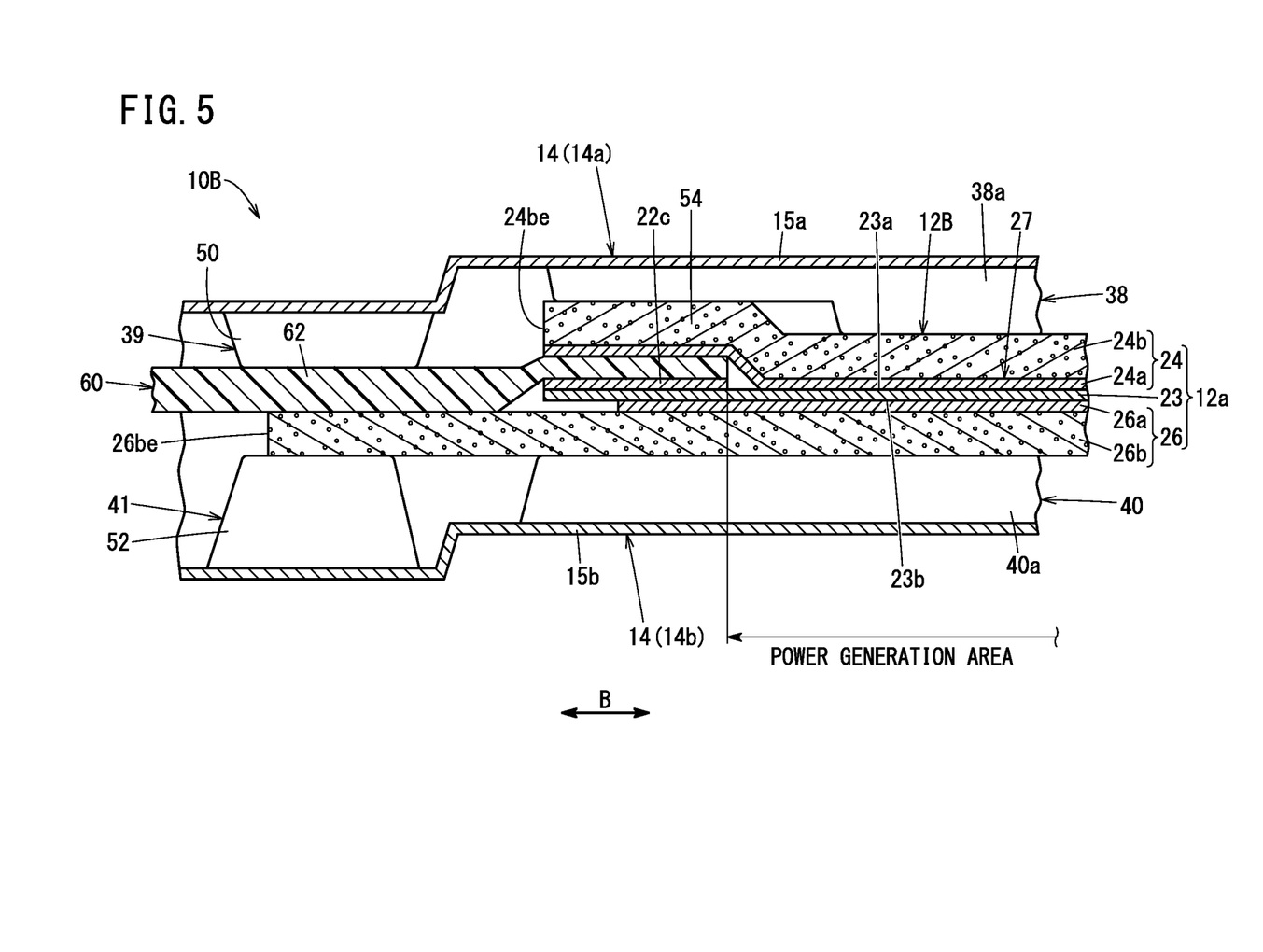
FIG. 5 is a cross-sectional view of a power generation cell according to a further aspect (second modification example).

In the resin-framed MEA 12B of the power generation cell 10B according to the embodiment shown in FIG. 5 (second modified embodiment), the resin frame member 60 is formed by one frame-shaped resin sheet 62. The frame-shaped resin sheet 62 is joined to the outer peripheral portion of the electrolyte membrane 23 via an adhesive layer 22c. According to the embodiment shown in FIG. 5, the resin frame member 60 can be simplified.

The above embodiments can be summarized as follows.

The above embodiment discloses the power generation cell (10) including: the resin-framed membrane electrode assembly (12) having the membrane electrode assembly (12a) and the resin frame member (22) joined to the outer peripheral portion of the membrane electrode assembly; the first separator (14a) provided on one surface of the resin-framed membrane electrode assembly; and the second separator (14b) provided on another surface of the resin-framed membrane electrode assembly, wherein the membrane electrode assembly includes the electrolyte membrane, the first electrode (24) provided on one surface of the electrolyte membrane, and the second electrode (26) provided on another surface of the electrolyte membrane and having the surface dimensions greater than the surface dimensions of the first electrode, the first separator includes the first reactant gas flow field (38) facing the power generation area of the membrane electrode assembly and allowing the first reactant gas to flow, the first passage (16a, 16b) penetrating through the power generation cell in the thickness direction, and the first buffer (39) connecting the first reactant gas flow field to the first passage, the second separator includes the second reactant gas flow field (40) facing the power generation area of the membrane electrode assembly and allowing the second reactant gas to flow, the second passage (18a, 18b) penetrating through the power generation cell in the thickness direction, and the second buffer (41) connecting the second reactant gas flow field to the second passage, the outer peripheral portion of the first electrode is positioned between the first buffer and the first reactant gas flow field, and an outer peripheral portion of the second electrode is arranged between the resin frame member and the second buffer in the direction in which the resin-framed membrane electrode assembly and the second separator are stacked.

The depth H2 in the second buffer may be greater than the depth H1 in the first buffer.

The first reactant gas flowing through the first buffer has the pressure higher than the pressure of the second reactant gas flowing through the second buffer.

The resin frame member has the first frame-shaped sheet (22a) and the second frame-shaped sheet (22b) joined to the first frame-shaped sheet.

The first electrode has the first electrode catalyst layer (24a) disposed on one surface of the electrolyte membrane, and the second electrode has the second electrode catalyst layer (24a) disposed on the other surface of the electrolyte membrane, and the catalyst coated membrane (27) is formed of the electrolyte membrane, the first electrode catalyst layer, and the second electrode catalyst layer, in the outer peripheral portion of the catalyst coated membrane, the electrolyte membrane, the first electrode catalyst layer, and the second electrode catalyst layer are sandwiched between the inner peripheral portion of the first frame-shaped sheet and the inner peripheral portion of the second frame-shaped sheet.

The first electrode includes the first electrode catalyst layer (24a) provided on the one surface of the electrolyte membrane, and the first gas diffusion layer (24b) laminated on the first electrode catalyst layer, the second electrode includes the second electrode catalyst layer (26a) provided on the another surface of the electrolyte membrane, and the second gas diffusion layer (26b) laminated on the second electrode catalyst layer and having the surface dimensions a greater than the surface dimensions of the first gas diffusion layer, the first electrode catalyst layer and the second electrode catalyst layer have different surface dimensions, the inner peripheral portion of the first frame-shaped sheet overlap with the outer peripheral portion of the membrane electrode assembly at the first overlapping portion (22ak), and is interposed between the first gas diffusion layer and one of the first electrode catalyst layer and the second electrode catalyst layer, whichever has greater surface dimensions, the inner peripheral portion of the second frame-shaped sheet overlaps with the outer peripheral portion of the membrane electrode assembly at the second overlapping portion (22bk), and is interposed between the second gas diffusion layer and another of the first electrode catalyst layer and the second electrode catalyst layer, whichever has smaller surface dimensions.

The first frame-shaped sheet and the second frame-shaped sheet are joined to each other by the adhesive layer (22c).

The adhesive layer provided on the inner peripheral portion of the first frame-shaped sheet is in contact with the larger electrode catalyst layer, and the adhesive layer provided on the inner peripheral portion of the second frame-shaped sheet is in contact with the smaller electrode catalyst layer.

The resin frame member is formed of a single frame-shaped sheet (62).

The first extended length (L1) of the second electrode extended outward from the first electrode in the longitudinal direction of the first reactant gas flow field and the second reactant gas flow field is larger than the second extended length (L2) of the second electrode extended outward from the first electrode in the width direction of the first reactant gas flow field and the second reactant gas flow field.

The first buffer or the second buffer has one or both of flow guide protrusions (50t, 52t) and bosses.

The overlapping portion (54) where the inner peripheral portion of the resin frame member and the outer peripheral portion of the first electrode overlap each other is positioned outward of the first reactant gas flow field.

The above embodiment discloses the resin-framed membrane electrode assembly (12) including the membrane electrode assembly (12a) and the resin frame member (22) joined to the outer peripheral portion of the membrane electrode assembly, wherein the membrane electrode assembly includes the electrolyte membrane (23), the first electrode (24) provided on one surface of the electrolyte membrane, and the second electrode (26) provided on another surface of the electrolyte membrane and having the surface dimensions greater than the surface dimensions of the first electrode, the first electrode includes the first electrode catalyst layer (24a) provided on the one surface of the electrolyte membrane, and the first gas diffusion layer (24b) laminated on the first electrode catalyst layer, the second electrode includes the second electrode catalyst layer (26a) provided on the another surface of the electrolyte membrane, and the second gas diffusion layer (26b) laminated on the second electrode catalyst layer and having the surface dimensions greater than the surface dimensions of the first gas diffusion layer, the catalyst coated membrane (27) is formed of the electrolyte membrane, the first electrode catalyst layer and the second electrode catalyst layer, the resin frame member includes the first frame-shaped sheet (22a), the second frame-shaped sheet (22b) joined to the first frame-shaped sheet, the inner peripheral portion of the first frame-shaped sheet and the inner peripheral portion of the second frame-shaped sheet sandwich the electrolyte membrane, the first electrode catalyst layer and the second electrode catalyst layer at the outer peripheral portion of the catalyst coated membrane, the resin frame member includes the non-overlapping portion (22f) that is not overlapped with the catalyst coated membrane, the outer end (24be) of the first gas diffusion layer is positioned inwardly of the non-overlapping portion, and the outer peripheral portion of the second gas diffusion layer is positioned within the non-overlapping portion.

The present invention is not limited to the embodiments described above, and various modifications are possible without departing from the essence and gist of the invention.

What is claimed is:

1. A power generation cell comprising:
a resin-framed membrane electrode assembly having a membrane electrode assembly and a resin frame member joined to an outer peripheral portion of the membrane electrode assembly;
a first separator provided on one surface of the resin-framed membrane electrode assembly; and
a second separator provided on another surface of the resin-framed membrane electrode assembly, wherein
the membrane electrode assembly includes an electrolyte membrane, a first electrode provided on one surface of the electrolyte membrane, and a second electrode provided on another surface of the electrolyte membrane and having surface dimensions greater than surface dimensions of the first electrode,
the first electrode includes a first gas diffusion layer,
the second electrode includes a second gas diffusion layer having surface dimensions greater than surface dimensions of the first gas diffusion layer,
the first separator includes a first reactant gas flow field facing a power generation area of the membrane electrode assembly and allowing a first reactant gas to flow, a first passage penetrating through the power generation cell in a thickness direction, and a first buffer connecting the first reactant gas flow field to the first passage,
the second separator includes a second reactant gas flow field facing the power generation area of the membrane electrode assembly and allowing a second reactant gas to flow, a second passage penetrating through the power generation cell in the thickness direction, and a second buffer connecting the second reactant gas flow field to the second passage,
an outer peripheral portion of the first electrode is positioned between the first buffer and the first reactant gas flow field,
an outer peripheral portion of the second gas diffusion layer is arranged between the resin frame member and the second buffer in a direction in which the resin-framed membrane electrode assembly and the second separator are stacked,
the first buffer includes a first protrusion protruding toward the resin frame member, the first protrusion being out of abutment with the first gas diffusion layer,
the second buffer includes a second protrusion protruding toward the resin frame member, the second protrusion being in abutment with the second gad diffusion layer,
the resin frame member has a first frame-shaped sheet and a second frame-shaped sheet joined to the first frame-shaped sheet, and
the first electrode has a first electrode catalyst layer disposed on one surface of the electrolyte membrane,
the second electrode has a second electrode catalyst layer disposed on the another surface of the electrolyte membrane,
a catalyst coated membrane is formed of the electrolyte membrane, the first electrode catalyst layer, and the second electrode catalyst layer, and
in an outer peripheral portion of the catalyst coated membrane, the electrolyte membrane, the first electrode catalyst layer, and the second electrode catalyst layer are sandwiched between an inner peripheral portion of the first frame-shaped sheet and an inner peripheral portion of the second frame-shaped sheet.

2. The power generation cell according to claim 1, wherein a depth in the second buffer is greater than a depth in the first buffer.

3. The power generation cell according to claim 2, wherein the first reactant gas flowing through the first buffer has a pressure higher than a pressure of the second reactant gas flowing through the second buffer.

4. The power generation cell according to claim 1, wherein
and the first gas diffusion layer is laminated on the first electrode catalyst layer,
and the second gas diffusion layer is laminated on the second electrode catalyst layer,
the first electrode catalyst layer and the second electrode catalyst layer have different surface dimensions,
an inner peripheral portion of the first frame-shaped sheet overlaps with the outer peripheral portion of the membrane electrode assembly at a first overlapping portion, and is interposed between the first gas diffusion layer and the first electrode catalyst layer, and an inner peripheral portion of the second frame-shaped sheet overlaps with the outer peripheral portion of the membrane electrode assembly at a second overlapping portion, and is interposed between the second gas diffusion layer and the second electrode catalyst layer.

5. The power generation cell according to claim 4, wherein the first frame-shaped sheet and the second frame-shaped sheet are joined to each other by an adhesive layer.

6. The power generation cell according to claim 5, wherein the adhesive layer provided on the inner peripheral portion of the first frame-shaped sheet is in contact with the first electrode catalyst layer, and the adhesive layer provided on the inner peripheral portion of the second frame-shaped sheet is in contact with the second electrode catalyst layer.

7. The power generation cell according to claim 1, wherein a first extended length of the second electrode extended outward from the first electrode in a longitudinal direction of the first reactant gas flow field and the second reactant gas flow field is larger than a second extended length of the second electrode extended outward from the first electrode in a width direction of the first reactant gas flow field and the second reactant gas flow field.

8. The power generation cell according to claim 1, wherein the first buffer or the second buffer has one or both of flow guide protrusions and bosses.

9. The power generation cell according to claim 1, wherein an overlapping portion where an inner peripheral portion of the resin frame member and an outer peripheral portion of the first electrode overlap each other is positioned outward of the first reactant gas flow field.

10. A resin-framed membrane electrode assembly comprising a membrane electrode assembly and a resin frame member joined to an outer peripheral portion of the membrane electrode assembly, wherein the membrane electrode assembly includes an electrolyte membrane, a first electrode provided on one surface of the electrolyte membrane, and a second electrode provided on another surface of the electrolyte membrane and having surface dimensions greater than surface dimensions of the first electrode, the first electrode comprises a first electrode catalyst layer provided on the one surface of the electrolyte membrane, and a first gas diffusion layer laminated on the first electrode catalyst layer, the second electrode comprises a second electrode catalyst layer provided on the another surface of the electrolyte membrane, and a second gas diffusion layer laminated on the second electrode catalyst layer and having surface dimensions greater than surface dimensions of the first gas diffusion layer, a catalyst coated membrane is formed of the electrolyte membrane, the first electrode catalyst layer and the second electrode catalyst layer, the resin frame member includes a first frame-shaped sheet and a second frame-shaped sheet joined to the first frame-shaped sheet, an inner peripheral portion of the first frame-shaped sheet and an inner peripheral portion of the second frame-shaped sheet sandwich the electrolyte membrane, the first electrode catalyst layer and the second electrode catalyst layer at an outer peripheral portion of the catalyst coated membrane, the resin frame member includes a non-overlapping portion that is not overlapped with the catalyst coated membrane, an outer end of the first gas diffusion layer is positioned inwardly of the non-overlapping portion, an outer peripheral portion of the second gas diffusion layer is positioned within the non-overlapping portion, the inner peripheral portion of the first frame-shaped sheet includes a first overlapping portion overlapping the outer peripheral portion of the catalyst coated membrane, the first overlapping portion is arranged between an outer peripheral portion of the first gas diffusion layer and an outer peripheral portion of the catalyst coated membrane, the inner peripheral portion of the second frame-shaped sheet includes a second overlapping portion overlapping the outer peripheral portion of the catalyst coated membrane, and the second overlapping portion is arranged between the outer peripheral portion of the second gas diffusion layer and the outer peripheral portion of the catalyst coated membrane.

* * * * *